April 3, 1951 G. B. KIDD 2,547,162
ELECTRONIC INVERTER
Filed Dec. 18, 1948

George B Kidd
INVENTOR

UNITED STATES PATENT OFFICE 2,547,162

ELECTRONIC INVERTER

George B. Kidd, Dayton, Ohio

Application December 18, 1948, Serial No. 66,117

2 Claims. (Cl. 321—36)

This invention relates to inverters deriving alternating current power from a direct current source through the use of gaseous discharge tubes.

Gaseous discharge tubes are often used to convert direct current power into alternating current power either as an inverter or as a part of a frequency converter. Now the load, load power factor, ambient temperature, alternating current frequency and the direct current input voltage all act to change the output voltage. It so happens that in many applications, particularly in aircraft service, no control is had over any of the above listed factors except frequency which must be maintained constant. In these applications the output voltage will vary dependant upon load, load power factor, ambient temperature and the direct current input voltage. Common practice in these cases is to change the value of the output inductance or the commutating capacitance effectively by use of a saturable reactor directly or in conjunction with a monocyclic square or to simply use a saturable reactor in series circuit relationship to decrease the output voltage to the predetermined correct value. All of these present devices have a limited range of voltage adjustment, require large and heavy components as they all adjust power at the inverter output and generally are inefficient. In some cases, such as when an inverter is used to supply exciting power to a variable speed alternator, a sufficient range of output voltage variation cannot be obtained with present regulatory means.

It is the chief object of this invention to provide a method and apparatus for adjusting the output voltage of an electronic inverter, over a large range, regardless of variations in frequency, load and load power factor of the alternating current output, ambient temperature, and direct current input voltage.

In an electronic inverter the gaseous discharge tubes conduct when the grid voltage becomes sufficiently positive with respect to the cathode and continues to conduct until the anode voltage is reduced to a certain low value. Now under a given set of operating conditions two similar inverters operating at the same frequency would have a phase difference between their output voltages which would depend upon the difference in time, referred to one cycle of the operating frequency, at which their respective grids became sufficiently positive to initiate discharge in the tubes. This time difference may be caused by a change in the direct current bias voltage on one set of tubes or by introducing a phase shift between the driving source and one set of grids. Now if the output voltages are added vectorially the sum of the voltages, or the output voltage of the combination, may readily be made to vary over a large range by adjusting the phase angle between the two voltages.

The present invention will be described with reference to the accompanying drawings in which similar reference numerals denote similar parts.

Figure 1:
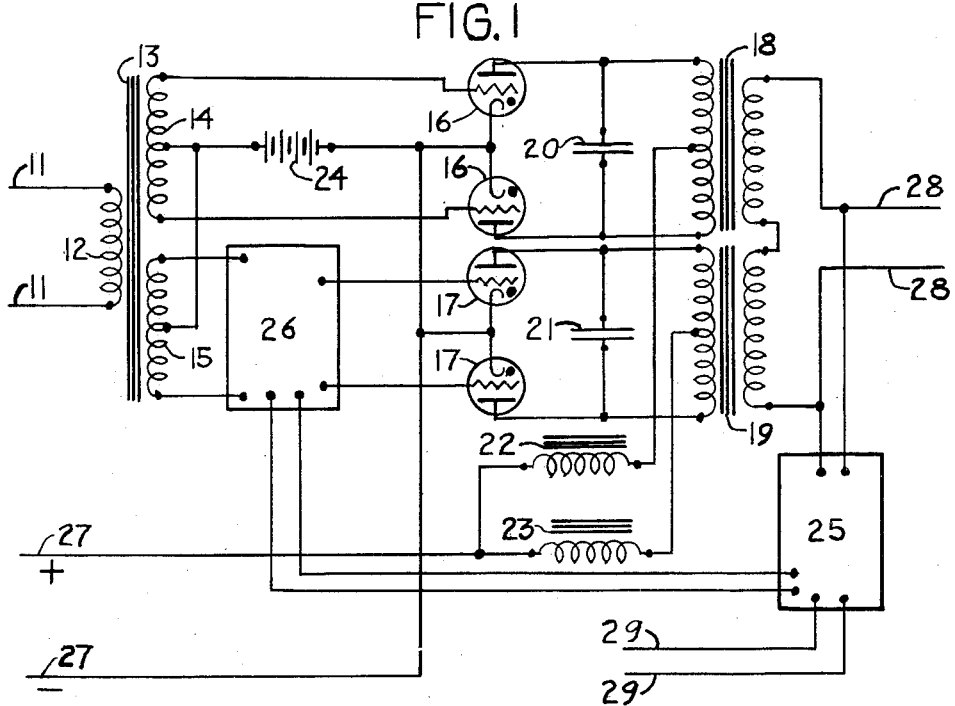
Figure 1 is a diagram of a single phase electronic inverter using phase shift for control.

Referring to Figure 1 voltage of the desired output frequency is supplied to lines 11 from a local oscillator or other alternating current source and is in turn supplied to primary 12 of transformer 13. Secondaries 14 and 15 of transformer 13 supply alternating grid voltage to the pairs of gaseous discharge tubes 16 and 17. Grid bias voltage is also supplied to these tubes by a source 24 denoted for simplicity as a battery. The plate circuit of tubes 16 consists of an output transformer 18 and a commutating capacitor 20 and is supplied with direct current from the positive line 27 through reactor 22. The plate circuit of tubes 17 consists of an output transformer 19 and a commutating capacitor 21 and is supplied with direct current from the positive line 27 through reactor 23. The secondaries of output transformers 18 and 19 are connected in series circuit relationship so that their voltages are additive and are connected to the inverter output lines 28. Voltage regulator 25 is connected to the lines 28 whose voltage it attempts to maintain constant and receives auxiliary power from lines 29 which may be supplied from the inverter, from the direct current input or from a suitable external source. Voltage regulator 25 may be any one of a number of well known types capable of delivering voltages at its output corresponding to different voltages at lines 28. The output of voltage regulator 25 is supplied to phase shifter 26. Phase shifter 26 may be any well known circuit such as that using a saturable reactor or a reactance tube to cause a phase shift in response to a change in the signal supplied to it. Depending upon the type of phase shift circuit auxiliary power may also be required for its operation. The grids of tubes 17 are connected to secondary 15 of transformer 13 through phase shifter 26.

Then the circuit represents two usual electronic inverter circuits with their grids supplied from the same source but the grids of one inverter channel having the phase of its voltages shifted by a controllable amount compared to the grid voltages of the other inverter channel, and with their output voltages added by use of a series connection.

In operation if no phase shift were introduced into the grid circuit of tubes 17 the voltage across lines 28 would be larger than the desired predetermined output voltage. Since the output voltage would be too large a voltage from regulator 25 would be supplied to phase shifter 26 causing the voltage at the grids of tubes 17 to be out of phase with that across transformer secondary 15. Dependant upon the type of phase shifter used the phase shift introduced could be either leading or lagging and for the purpose of this invention either would be satisfactory. Now the voltages across the secondaries of transformers 18 and 19 will also be out of phase and their sum at lines 28 will be decreased. If for any reason the voltage at lines 28 increased further a larger signal from voltage regulator circuit 25 would result and a larger phase shift in the same direction would be introduced by circuit 26. The opposite would be true if the output voltage were too small.

Figure 2:
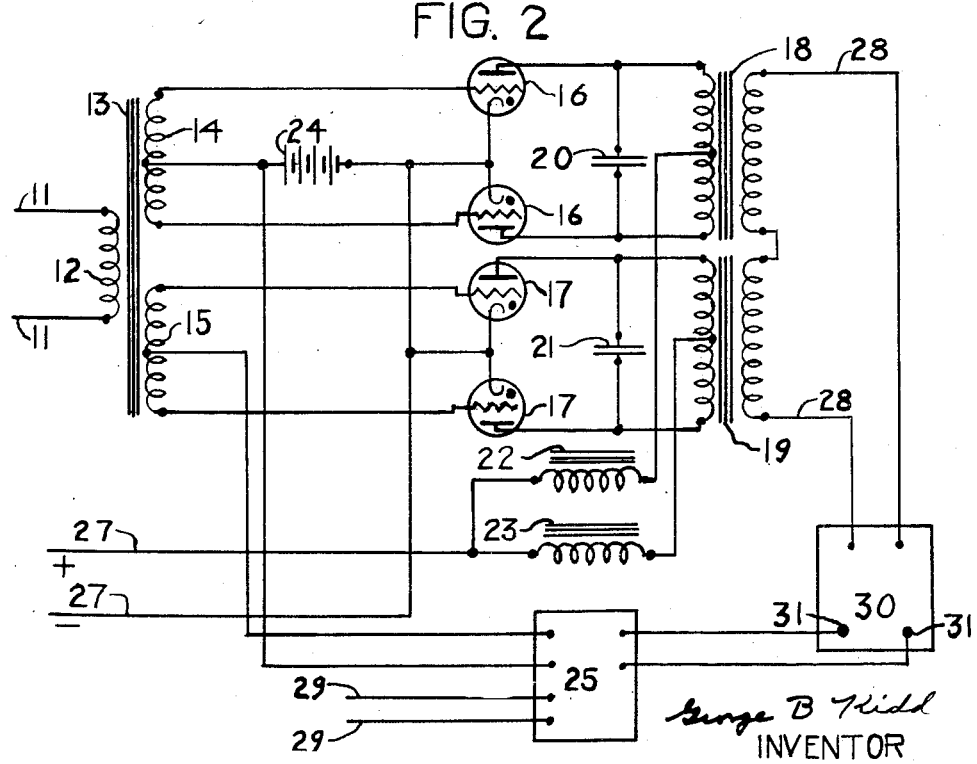
Figure 2 is a diagram of a single phase of an electronic inverter using grid bias voltage change for control.

Figure 2 represents the same circuit with the exception that phase shift circuit 26 is omitted and a voltage from regulator circuit 25 is used to change the grid bias voltage of tubes 17 causing the tubes to conduct at earlier or later times and having the same effect as advancing or retarding the phase of the alternating grid voltage, that a load 30 is connected to the inverter output and that the regulator 25 attempts to maintain the voltage at terminals 31 constant. Terminals 31 may either be connected to the input of the equipment 30 or at some other point at which it is desired to maintain a constant voltage. For example if 30 were an alternator using an alternating current field the field would be supplied from the inverter and terminals 31 would be the alternator output. In polyphase inverters each phase would consist of two channels with their outputs connected in series circuit relationship and with a means of effectively causing a phase shift between the grid circuits of the two channels.

In the diagrams parallel type inverters are shown but with correct grid input circuits and power output circuits the principle of the invention applies to series types as well.

While two embodiments of the invention have been described and illustrated it will be apparent to those skilled in the art that many changes, omissions, additions and substitutions may be made therein without departing from the scope of my invention as set forth in the accompanying claims.

What is claimed is:

1. In combination, a source of direct current power, two electronic inverters employing gaseous discharge tubes, means for connecting the output circuits of said inverters in effective series circuit relationship to form a combined output circuit, a source of alternating current power, means for supplying the grids of the tubes of said inverters from said alternating current power source, means for obtaining a direct current voltage dependant in value upon the amount by which the voltage from the combined output circuit differs from a predetermined value, and means for varying the grid bias voltage of the tubes of one said inverter compared to the grid bias voltage of the tubes of the other inverter in response to this direct current voltage.

2. In combination, a source of direct current power, two electronic inverters employing gaseous discharge tubes, means for connecting the output circuits of said inverters in effective series circuit relationship to form a combined output circuit, a source of alternating current power, means for supplying the grids of the tubes of said inverters from said alternating current power source, means for obtaining a voltage dependant in value upon the amount by which the voltage from the combined output circuit differs from a predetermined value, and means responsive to the voltage so obtained for varying the phase of the alternating current voltage applied to the grids of the tubes of one inverter compared to the phase of the alternating current voltage applied to the grids of the tubes of the other inverter.

GEORGE B. KIDD.

REFERENCES CITED

The following references are of record in the file of this patent:

UNITED STATES PATENTS

| Number | Name | Date |
|---|---|---|
| 2,080,250 | Bedford | May 11, 1937 |
| 2,179,366 | Willis | Nov. 7, 1939 |